May 15, 1934.  F. N. H. SETTERWALL  1,959,308
VARIABLE LEVERAGE MECHANISM
Filed March 24, 1932
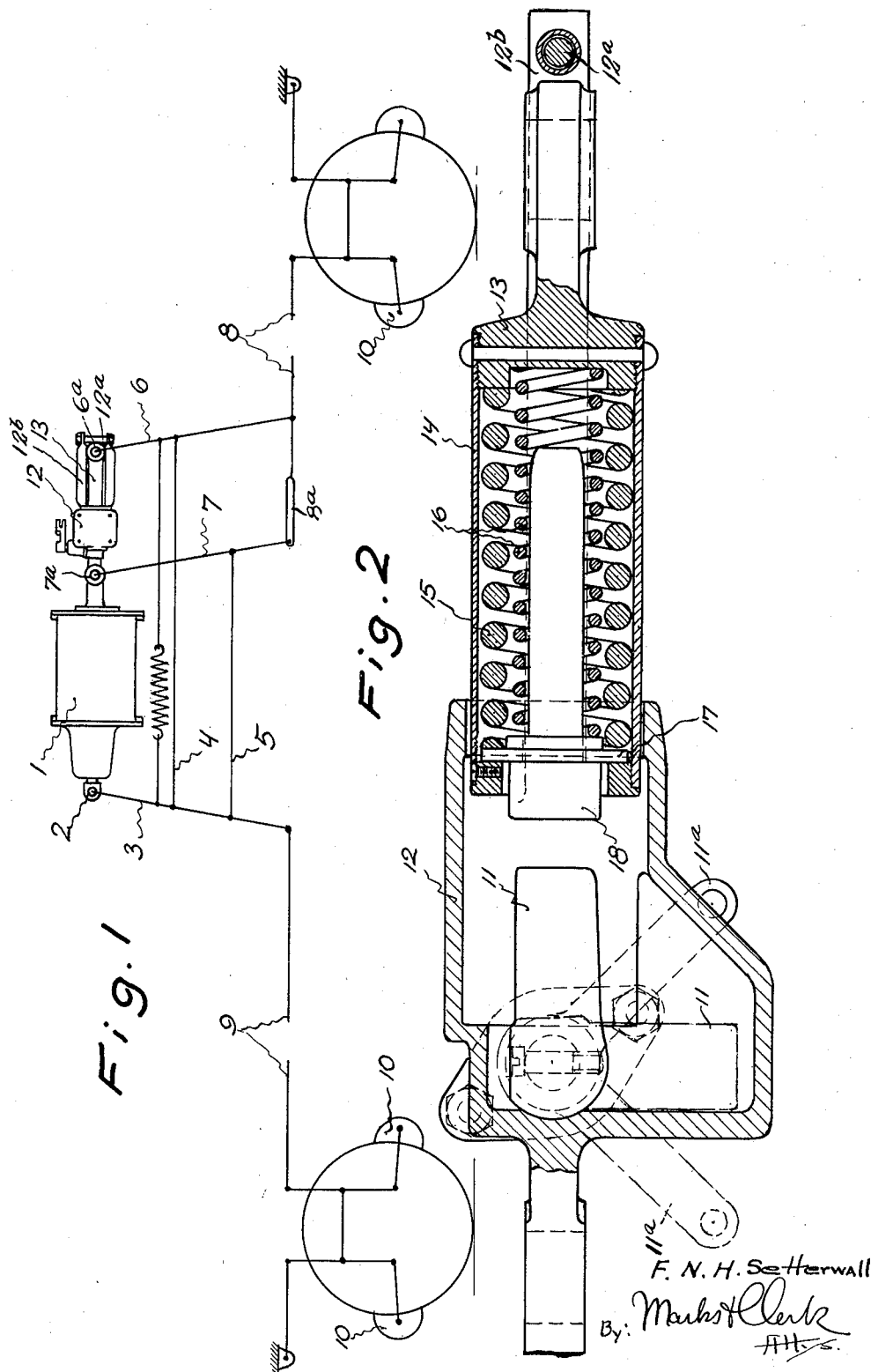

Patented May 15, 1934

1,959,308

UNITED STATES PATENT OFFICE 1,959,308

VARIABLE LEVERAGE MECHANISM

Folke Nils Henrik Setterwall, Malmo, Sweden, assignor to Svenska Aktiebolaget Bromsregulator, Malmo, Sweden, a corporation of Sweden Application March 24, 1932, Serial No. 600,985
In Germany April 1, 1931

4 Claims. (Cl. 188—195)

The present invention relates to vehicle brakes, especially brakes of railway cars, of the type in which the ratio of leverage in the brake rigging between the source of brake power and the brake shoes acting upon the wheels is variable for the purpose of accommodating the brake power to the load of the car.

In brakes of the said type, the movement necessary for the brake operation at the source of brake power, as for instance the stroke of the brake piston in a compressed air brake, is different according to whether the braking takes place at a smaller or larger ratio of leverage in the brake rigging or, in other words, according to whether the brake operation concerned is a tare braking or a load braking. It is true that, by certain steps (the employment of so called double acting slack adjusters and the like), it is possible to attain that the advancement of the brake shoes towards the wheels when braking, takes place at equal strokes of piston independent of the ratio of leverage at hand. However, a substantial portion of the stroke of piston dependent upon the deflection of the parts of the brake rigging transmitting the brake power under the action of the said power, occurs not until after the advancement of the brake shoes, and the length of the said portion of the stroke of piston is largely influenced by the ratio of leverage at hand. The degree of deflection of each particular part of the rigging may be considered to be directly proportional to the power applied, the said power, in turn, for the majortiy of the parts of the brake rigging being proportional to the ratio of leverage. On the other hand also the movement of the brake piston which correspond to a certain deflection of the parts of the brake rigging, is proportional to the ratio of leverage. Therefore, when changing the ratio of leverage in a certain brake rigging the portion of the stroke of brake piston corresponding to the deflection occurring when actual braking is taking place, that is, the stroke which follows after the normal slack distance has been traversed is not changed in direct proportion to the ratio of leverage but approximately to the square on the said ratio.

Therefore, the difference in stroke of brake piston in load braking and in tare braking is often rather considerable and this fact causes an essential disadvantage, above all manifesting itself by the feature that the braking operation in loaded and empty cars of the train is not uniform whereby jerks occur in the train. It is theoretically possible to neutralize the said irregularity by variation of the air supply to the brake cylinders, but this step means in most types of brakes an undesirable complication of the structure of the regulating valve and the members effecting the reversal.

Therefore, according to the invention, the disadvantage mentioned above is removed in an entirely different manner, viz. by making the stroke of brake piston equal or substantially equal in tare braking and load braking. According to the invention this is effected by inserting in the brake rigging a device which is in operation in tare braking and then brings about an additional deflection in the brake rigging corresponding to the increase of deflection of the brake rigging in load braking. By the said device the brake rigging as a unit will be subjected to the same deflection in tare as in load braking in spite of the difference in respect of brake power in load braking and in tare braking so that the strokes of brake piston will be approximately equal in both instances and the brake operation approximately uniform as well in loaded as in empty cars.

The invention is illustrated by way of example in the accompanying drawing, in which Fig. 1 shows, diagrammatically, an embodiment of a brake of railway cars of the type, in which the ratio of leverage between the brake pistons and the brake shoes is reversible for tare and load braking, i.e. a brake having a mechanical empty-load switch to which the invention may be applied, and Fig. 2 shows, on a larger scale, a longitudinal section through an embodiment of the additional spring device according to the invention inserted in the brake rigging.

In Fig. 1, 1 is the brake cylinder, 2 the brake piston rod, 3 the brake lever connected with the said rod, and 4 and 5 the equalization rods operative in tare braking and load braking, respectively, which are mounted between the brake lever 3 and the lever 6 or the dead lever 7, respectively. From the last mentioned levers 6 and 7 and from the brake lever 3 the pull rods 8 and 9, respectively, extend to the opposite ends of the car at which ends they are connected to the brake shoes 10. The dead lever 7 which is pivoted at $7^a$ is connected with the pull rod 8 by means of a slot $8^a$ in the said rod, while the lever 6 at the end remote from the pull rod 8 coacts with a reversible abutment by which the movement of the said end in tare braking is limited. In Fig. 2 the said abutment is marked 11 and rotatably mounted within a fixed housing 12 serving as a guide to a displaceable rod 13 to which the lever 6 is pivotally connected at 6ª, Fig. 1. The rod 13 is prevented from travelling out of the housing 12 by means of a bolt 12ª carried by rods 12ᵇ extending from the housing 12. In Fig. 2, the abutment 11 is shown in full lines in tare braking position, and for load braking it will be moved by means of the crank or handle 11ª from this position out of the path of movement of the displaceable rod 13 to the position shown in dotted lines. It will be seen that even in tare braking position of abutment 11 there is a certain distance between said abutment and the end of the displaceable rod 13 coacting therewith. Thus, at an application of the brake, the tare braking lever 6 must perform a certain amount of lost motion before rod 13 can abut against abutment 11, and during this lost motion of the tare braking lever 6 the load braking lever 7 is active for moving the brake shoes towards the wheels. Preferably the said distance is given such a value that rod 13 abuts against abutment 11 in the same moment in which the brake shoes attain abutting contact with the wheels. Thus, after the brake piston has travelled the same distance as would be the case with abutment 11 in inoperative position in order to bring the shoes into contact with the wheels, the lever 6 takes over the actuation of the shoes in order to apply the brake pressure proper upon them. In this manner, the stroke of the brake piston is influenced as little as possible by the change of gear ratio. The above device is considered to be known per se.

According to the invention, a spring device is inserted in a part of the brake rigging operative only in tare braking but not in load braking and, when operative, transmitting the brake power and having for its object to make the total deflection of the brake rigging in tare braking equal or approximately equal to the total deflection in load braking. In the embodiment of the invention shown in the drawing for the purpose of illustration, the said spring device is inserted in the rod 13 in the form of a spring buffer arranged to coact with the abutment 11. For the said purpose, in the embodiment shown, the corresponding part of the rod 13 is in the form of a casing 14 enclosing two pressure springs 15 and 16 engaging, at the end nearest to the abutment 11, a disc 17 on a bolt 18 axially displaceable in the casing 14. The springs 15 and 16 are dimensioned in such a manner as to yield sufficiently in tare braking to make the total deflection of the brake rigging of the same order of size as in load braking.

Although the mounting and structure of the spring device shown in the drawing is generally preferred it is evident that this is only an example of an embodiment, and the spring device may be constructed and mounted in several different ways without departing from the principle of invention. It might also be pointed out that the invention is not limited to the embodiment of the brake rigging and empty load switch shown in the drawing but may be applied to every embodiment of brake riggings having an empty load switch.

What I claim and desire to secure by Letters Patent is:—

1. In a vehicle brake, especially a brake for railway cars, a source of brake power, brake shoes for acting upon the wheels, a brake rigging arranged between the said source of brake power and brake shoes and having a variable ratio of leverage for the purpose of enabling it to be accommodated to the load of the car, a spring device inserted in the said brake rigging and operative when braking at a lower ratio of leverage to yield sufficiently in order to make the total deflection of the brake rigging amount to a value of the same order as when braking at a predetermined higher ratio of leverage.

2. In a vehicle brake according to claim 1, the additional feature that the spring device is mounted in a member of the brake rigging which takes part in the transmission of the brake power from the source of power to the brake shoes only in tare braking.

3. In a vehicle brake, especially a brake for railway cars, a source of brake power, brake shoes for acting upon the wheels, a brake rigging arranged between the said source of brake power and brake shoes and having a variable ratio of leverage for the purpose of enabling it to be accommodated to the load of the car, a member of the brake rigging taking part in the power transmission from the source of power to the brake shoes only in tare braking, and a spring device inserted in the said member of the brake rigging and arranged to yield sufficiently in order to make the total deflection of the brake rigging amount to a value of the same order as when braking at a predetermined higher ratio of leverage.

4. In a vehicle brake, especially a brake for railway cars, a source of brake power, brake shoes for acting upon the wheels, a brake rigging arranged between the said source of brake power and brake shoes and having a variable ratio of leverage for the purpose of enabling it to be accommodated to the load of the car, a reversible abutment, a displaceable member for coaction with the said abutment for limiting the motion of the said displaceable member, an additional lever pivoted to the said displaceable member, a spring device enclosed in the said displaceable member in the form of a spring buffer coacting with the abutment in tare braking.

FOLKE NILS HENRIK SETTERWALL.